(12) United States Patent
Chien et al.

(10) Patent No.: US 8,264,639 B2
(45) Date of Patent: *Sep. 11, 2012

(54) POLYMER ENHANCED CHOLESTERIC ELECTRO-OPTICAL DEVICES

(75) Inventors: Liang-Chy Chien, Hudson, OH (US); Lei Shi, Kent, OH (US); Sang Hwa Kim, Kent, OH (US)

(73) Assignee: Kent State University, Kent, OH (US)

( * ) Notice: Subject to any disclaimer, the term of this patent is extended or adjusted under 35 U.S.C. 154(b) by 259 days.

This patent is subject to a terminal disclaimer.

(21) Appl. No.: 12/590,181

(22) Filed: Nov. 4, 2009

(65) Prior Publication Data

US 2010/0051194 A1    Mar. 4, 2010

Related U.S. Application Data

(62) Division of application No. 11/435,083, filed on May 16, 2006, now Pat. No. 7,652,731.

(51) Int. Cl.
*G02F 1/1333* (2006.01)
*C09K 19/052* (2006.01)

(52) U.S. Cl. ............ 349/88; 349/182; 349/187; 428/1.1

(58) Field of Classification Search .............. 349/86–90, 349/182–187, 93, 175; 428/1.1–1.3
See application file for complete search history.

(56) References Cited

U.S. PATENT DOCUMENTS

| | | | |
|---|---|---|---|
| 4,917,475 A | 4/1990 | Meyer et al. | |
| 5,305,126 A | 4/1994 | Kobayashi et al. | |
| 5,437,811 A | 8/1995 | Doane et al. | |
| 5,691,795 A | 11/1997 | Doane et al. | |
| 5,695,682 A | 12/1997 | Doane et al. | |
| 5,906,825 A | 5/1999 | Seabrook, Jr. et al. | |
| 6,061,107 A | 5/2000 | Yang et al. | |
| 6,108,062 A | 8/2000 | Takeuchi et al. | |
| 6,327,017 B2 | 12/2001 | Barberi et al. | |
| 6,540,938 B1 | 4/2003 | Afzali-Arkadani et al. | |
| 6,652,776 B2 | 11/2003 | Sato et al. | |
| 6,897,915 B1 | 5/2005 | Lavrentovich et al. | |
| 6,912,018 B2 | 6/2005 | Faris et al. | |
| 6,970,211 B2 * | 11/2005 | Sikharulidze | 349/93 |

(Continued)

OTHER PUBLICATIONS 31 pages of a paper entitled "Fast Switching Flexoelectric Cholesteric Devices"; by Sang Hwa Kim, Lei Shi and Liang-Chy Chien; Liquid Crystal Institute, Kent State University, Kent, OH 44242 SPIE Defense & Security Symposium, Orlando, Fl, Apr. 17-21, 2006.

(Continued)

*Primary Examiner* — Dung T. Nguyen
(74) *Attorney, Agent, or Firm* — Hudak, Shunk & Farine

(57) ABSTRACT

The present invention provides liquid crystal devices comprised of a composite of an internal polymer network localized on the substrate surfaces and short-pitch dual-frequency switchable cholesteric liquid crystal that operate in two different modes including in-plane switching (amplitude modulation) and out-of-plane switching (phase modulation). The invention further provides a method of making a liquid crystal device demonstrating uniform lying helical axis where the device comprises a composite of an internal spatially ordered polymer network localized by in-situ photo-polymerization at the surface of the substrate. The invention can be used for flat panel displays, as well as spatial light modulators for applications such as optical waveguides, optical beam scanners, computer-generated holograms, and adaptive optics.

8 Claims, 4 Drawing Sheets

(a)

(b)

U.S. PATENT DOCUMENTS 7,038,743 B2      5/2006  Komitov
7,652,731 B2 *    1/2010  Chien et al. .................. 349/88
2006/0209232 A1 * 9/2006  Komitov et al. .............. 349/88

OTHER PUBLICATIONS 6 pages of Article from Liquid Crystals, 1998 vol. 24 No. 3, 329-334; Titled "Volume-Stabilized ULH Structure for the Flexoelectro-Optic Effect and the Phase-Shift Effect in Cholesterics" by P. Rudquist, L. Komitov and S. T. Lagerwall.

7 pages of BLCS Young Scientist Lecture 2004, Article entitle "Dual-Frequency HAN Cells: Rapid Switching with a New Twist"; Sharon A. Jewell; Thin Film Photonics Group, School of Physics, University of Exeter, UK.

* cited by examiner

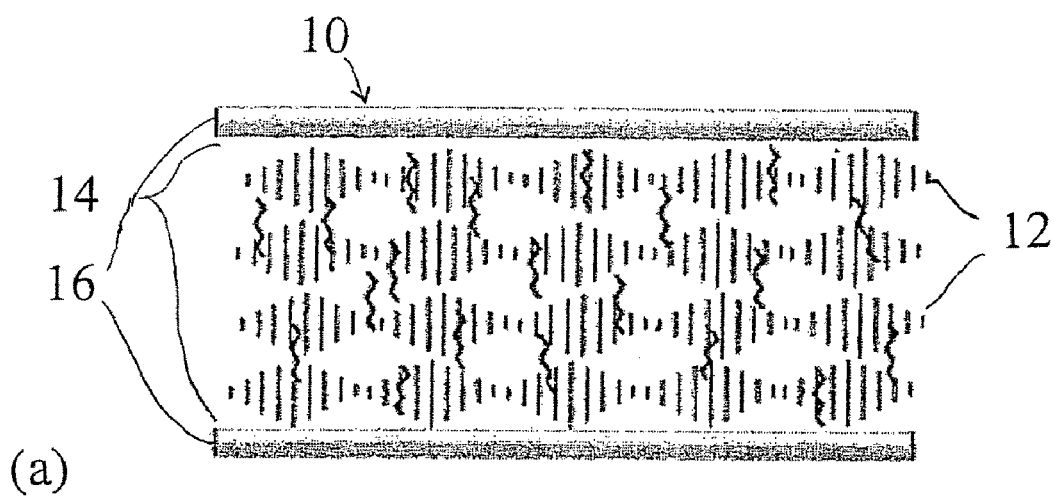
(a)
Figure 5
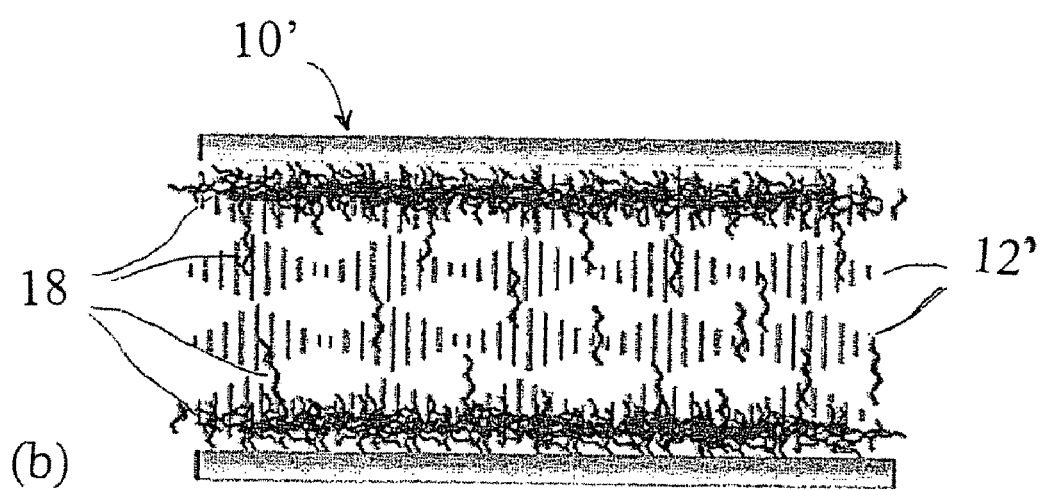
(b)

POLYMER ENHANCED CHOLESTERIC ELECTRO-OPTICAL DEVICES

CROSS REFERENCE

This is a division of U.S. application Ser. No. 11/435,083, filed May 16, 2006 for POLYMER ENHANCED CHOLESTERIC ELECTRO-OPTICAL DEVICES

FIELD OF THE INVENTION

The invention relates to liquid crystal devices which include an internal polymer network localized to a substrate surface and a short-pitch cholesteric liquid crystal having a positive dielectric anisotropy that can be employed to operate in different modes, such as, in-plane switching ("IPS", amplitude modulation) and out-of-plane switching (phase modulation). The present invention further relates to a method of making a liquid crystal device which includes the internal spatially ordered polymer network localized on the surface by in situ photopolymerization and which provides high contrast in-plane switching by using the flexoelectro-optical effect of the liquid crystal.

BACKGROUND OF THE INVENTION

The next generation liquid crystal displays (LCDs) will require LCDs with motion picture quality, ultra high contrast, brightness and wide viewing characteristics. Traditional LCDs are based on nematic technologies which are still deficient in response time for perfect motion picture viewing. The response time of LCDs has been improved by using thinner cell gap and higher switching voltage. However, the approach of using thinner cell gap increases the difficulty in the manufacturing process. In addition, using higher switching voltage to address the LCDs increases the power consumption.

The foregoing problems can be addressed through the use of liquid crystal devices comprised of composite materials which are mixtures of polymer and liquid crystals and which have suitable sub-millisecond response time for the higher demands of next generation viewing. Further, these devices display two modes of switching: phase-only (in-plane switching at low field) and birefringence (out-of-plane at high field). Apart from being useful for flat panel displays, the devices are useful as spatial light modulators for applications such as optical waveguides, optical beam scanners, computer-generated holograms, and adaptive optics.

In accordance with the present invention, these novel electro-optical devices use the flexoelectric-optical effect of short-pitch cholesterics. By using a polymer to stabilize or modify the liquid crystal phase structures, two modes of electro-optical switching are possible: 1) at a low applied voltage the molecules rotate in the plane parallel to the plane of the substrates and can give high modulation of the transmitted light intensity due to the field-induced tilt of the optical axis; 2) at a high applied electric field the molecules are switched in the direction perpendicular to the plane of the substrates. The polymer content in the composite can vary from a few percent (polymer stabilization type) to as high as possible, such as 40%, preferably 20%, and more preferably 1 to 10% (polymer dispersed type) as long as the polymer does not interfere the switching of liquid crystal molecules.

It is known that a short-pitch cholesteric material with its helical axis originally oriented perpendicular to the plane of the substrates can be re-oriented to parallel to the substrate by using a small bias voltage. The literature reports the preparation of a cholesteric liquid crystal (ChLC) cell flexoelectro-optical device using in-plane uniform lying helical (ULH) texture. The uniform cholesteric film behaves as a switchable birefringent plate. An in-plane rotation of the optical axis can be achieved by applying an electric field across the cholesteric film, which was reported by Meyer as the flexoelectric effect. The term "flexoelectric effect" is used herein to refer to this in-plane rotation of the helical optical axis of a cholesteric film through the application of an electric field. The degree of field-induced in-plane rotation of the helical axis depends on the strength of applied electric field for a cholesteric material with positive dielectric anisotropy. The intensity of light transmitted through the cell as a function of applied electric field is governed by the following equation:

$$I=I_o \sin^2 2\phi \sin^2(\pi d \Delta n 1 \lambda)$$

where $\phi$ is the angle between the optical (helical) axis and the polarizer at zero field, d is the cell gap, $\Delta n$ is the effect sample birefringence, and $\lambda$ is the wavelength of light. Therefore, the linear modulation of the transmitted light incurred by the flexoelectric effect will be the major contribution at the low fields. An out-of-plane switching can be effected through the use of a positive dielectric anisotropy liquid crystal material and the application of an applied voltage which exceeds the critical field of unwinding the cholesteric helix. Unwinding of the helix takes place when a high voltage is applied to the device since the dielectric coupling is a polar and a linear effect. However, the flexoelectric-optical effect vanishes upon shutting down the device and therefore requires a warm-up period to achieve the threshold voltage.

There has been an attempt by P. Rudquist, L. Komitov and S. T. Lagerwall in 1998 and reported in *Liq. Cryst.*, 24, at page 329 to stabilize the ULH texture of a short pitch cholesteric by polymer network created in the volume of the cholesteric. The authors indicated that once the field is removed, the cholesteric twists up again and the uniform laying helix (ULH) texture is reacted just as it was before unwinding. However, the stabilization of ULH texture by polymer network proposed by Rudquist et al resulted in a residual birefringence of the completely unwound cholesteric texture due to the morphology of the polymeric network formed into the bulk of the cholesteric liquid crystal by means of photopolymerization of 10 wt % photoreactive monomer dissolved in the cholesteric liquid crystal. The residual birefringence in turn decreased the contrast of the cell optical appearance at applied electric field higher than the threshold one for unwinding of helical axis thus affecting severely the efficiency of the modulation in the cell birefringence due to the field induced helix unwinding. Moreover, the dense polymer network stabilizing the ULH texture of the cholesteric reported by Rudquist et al negatively affects the cell performance in the degree of the light intensity modulation as well as the switching time.

To our best knowledge an efficient polymer stabilization of short pitch cholesteric liquid crystal in ULH texture that avoids any residual birefringence originating from the polymer network created in the volume of the cholesteric liquid crystal oriented in ULH texture has not been realized yet. Most important, surface stabilization of the ULH texture of short pitch cholesteric has never been reported. In addition, device that operates in polar (flexoelectric) as well as quadratic, with the applied electric field (helix unwinding), mode has not been realized yet. The present invention relates to the discovery that a surface-localized and periodically-structured polymer can be used to create uniform lying helical texture with high optical contrast of flexoelectric cholesteric devices without the need for a threshold (or warm-up) voltage to maintain the uniform lying helical texture. The liquid crystal device of the present invention employs in-plane rotation of the optical axis which is achieved by applying an electric field across the cholesteric film to provide a flexoelectric effect and which enables two modes of switching. However, the out-of-plane dielectric coupling hinders the large in-plane rotation of axis from minimum to the maximum light transmittance and hence, the optical contrast. Therefore, as a further aspect of the invention novel cholesteric liquid crystal material and electro-optical optimization are used to achieve the maximum optical contrast for the in-plane switching mode without the dielectric coupled out-of-plane switching.

SUMMARY OF THE INVENTION

It is therefore, an aspect of the present invention to provide liquid crystal devices comprised of a composite of an internal polymer network localized on one or more substrate surfaces and short-pitch cholesteric liquid crystal having a positive dielectric anisotropy that can be employed to operate in different modes, such as, in-plane switching (frequency modulation) and out-of-plane switching (phase modulation). It is likewise an aspect of the present invention to provide a method of making a liquid crystal device that comprises the internal spatially ordered polymer network localized on the surface of the substrate. In this context, "localized on the surface" refers to a polymer network which is concentrated at the surface of the substrate of a liquid crystal cell and wherein the bulk of the cell has a relatively lower concentration of the polymer network, and more specifically, wherein the bulk may be relatively or substantially free from the polymer network, i.e. having less than about 25%, or preferably less than about 10% polymer network through the center of the cholesteric film. The invention is related to a method for localized stabilization of the ULH texture of a short pitch cholesteric liquid crystal by means of a polymer network created at the substrate interface with the cholesteric by means of photo polymerization of a photo reactive monomer dissolved into the cholesteric liquid crystal material. Furthermore, the present invention has the advantage over the known prior art which uses the flexoelectro-optical effect of liquid crystal of providing high contrast in-plane switching.

The present invention further provides a method for fabricating a fast in-plane switching flexoelectric cholesteric device which includes a dual-frequency switchable nematic in a short-pitch cholesteric liquid crystal mixture. For example, response times for the invention are at least at low as 1000 µS, and preferably at least as low as 500 µS, or of the magnitude of about 100 µS. This method uses a "surface-stabilized polymer" as contrasted to a "volumetric stabilized polymer". "Surface-stabilized polymer or polymer network" is used herein to mean that the device has a stabilizing polymer network which is substantially restricted to a surface sub-region of the liquid crystal cell which is induced by strong ultra violet irradiation. In particular, a mixture comprising a short pitch cholesteric liquid crystal with one of more photo reactive monomers and a photo initiator is introduced in a gap between the surface aligned substrates of a liquid crystal cell and heated above the isotropic state of the liquid crystal. The device is cooled and subjected to ultra violet light at a wave length of about 320 to about 380, and preferably 320 to 365, nanometers all under an applied electric field to achieve polymerization of the reactive monomers at the surface.

BRIEF DESCRIPTION OF DRAWINGS

FIG. 5 is a representation of the mixture of the monomer and the liquid crystal in a liquid crystal cell where FIG. 5(a) is prior to polymerization and FIG. 5(b) represents double surface stabilization by UV irradiation of both sides of the liquid crystal cell; FIG. 6(a) is a plot of the applied voltage versus time for in-plane switching and FIG. 6(b) is a plot of the applied voltage versus time for out-of-plane switching.

DETAILED DESCRIPTION OF THE INVENTION

Figure 1:
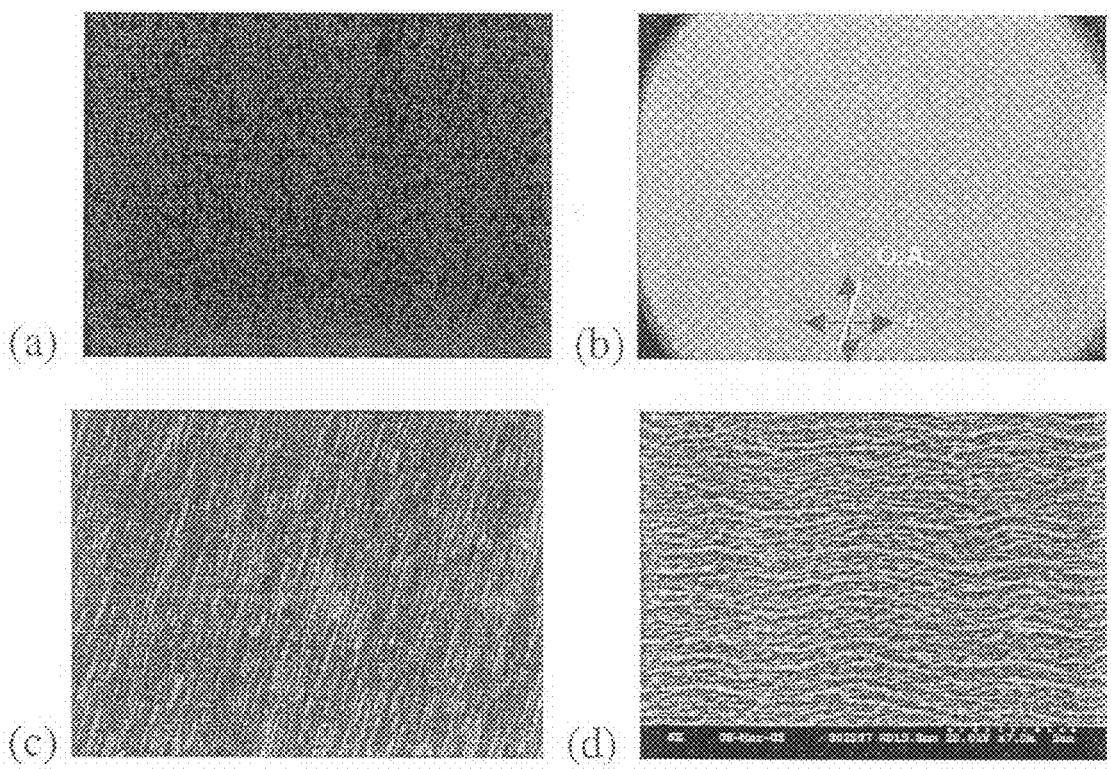
FIG. 1 is the polarizing optical micrographs of a short-pitch cholesteric (a) heating to the isotropic temperature 106° C., (b) cooling to room temperature with the electric field of 5 V/µm, (c) the uniform lying helix texture of a cholesteric with polymer stabilization at zero voltage. (i.e., having a helical axis lying at 30 degrees with respect to a set of crossed polarizers, and (d). The SEM image of a surface localized polymer network having a regular periodicity of 0.3 micron.

The present invention relies on composite of a surface localized spatially ordered polymer network and short-pitch cholesteric liquid crystal exhibiting the uniform lying helical ("ULH") for flexoelectric switching and phase modulation.

The helical nature of the optical axis of the liquid crystal of the present invention results from its chirality. Many liquid crystal phases (e.g. cholesteric, blue, TGB and SmC* phases) are chiral due to the introduction of chirality of the same sign at the molecular level. The long-range orientation order of liquid crystalline phases and the chirality of the molecules lead to a spontaneous twist in a micrometer range of less than a micron, i.e. the chirality transfers from a molecular to "mesoscopic" range, and the phase becomes chiral. The chiral nematic (cholesteric) phase, characterized by a helical order of molecules, can adopt Grandjean or fingerprint texture, with the helical axis oriented perpendicular or parallel, respectively, to the confining substrates. In the irregular fingerprint texture the helical axis has random in-plane distribution that can be transformed into a uniformly lying helix (ULH) texture, with the helix axis lying everywhere along a unique direction parallel to the substrates. Depending on the pitch and cell gap ratio the helical axis in ULH texture may be oriented either along or perpendicular to the rubbing direction of surface alignment layers for a homogeneous alignment electro-optical cell.

A short-pitched cholesteric layer with ULH texture behaves macroscopically as a uniaxial birefringent crystal plate with its optic axis along the helix. Upon rotating the sample between the crossed polarizers, a full extinction of the transmitted light will be achieved when the helix axis coincides with the transmission direction of one of the polarizers. With an applied electrical field across the cholesteric layer, an in-plane deviation of the effective optical axis may occur, an effect described by Patel and Meyer. The effect is flexoelectric in origin and exhibits a linear behavior in the electric field at low applied voltage, where the dielectric coupling between the liquid crystal molecules and the applied field can be neglected. The field-induced deviation of the optic axis due to the flexoelectric effect was found to be linear in applied field.

Furthermore, a relation between the sense of the field-induced deviation of the optic axis and the helix handedness was found by Komitov et al. The field-induced tilt of the optic axis is a linear function of the field and is governed by the equation $$\phi = eEp/K$$

where $e = \frac{1}{2}(e_s + e_b)$
$K = \frac{1}{2}(K_{11} + K_{33})$
$e_s$ and $e_b$ are the average values of the splay and bend flexoelectric coefficients, and $K_{11}$ and $K_{33}$ are the splay and bend elastic constants, respectively; and p is the cholesteric pitch. Increasing the field involves a quadratic effect because of the dielectric coupling. The helix then deforms at the same time as the pitch increases. When the field exceeds a certain critical value the helix is completely unwound. This means that the electro-optic effect of this device mode is a combination of flexoelectric and dielectric coupling up to a reasonably high field.

Problems encountered in using the flexoelectric-optic effect in the field-induced unwound short-pitched cholesteric liquid crystal include irreversible damage caused by dielectric coupling such as the sign and magnitude of dielectric anisotropy; degradation of alignment by the surfaces since either planar or homeotropic surface condition support the unwound helical structure in ULH texture; and the phase transition since any commercial device must withstand a large temperature variation and still function acceptably.

The method of making the LCD of the present invention may be described with reference to FIG. 1. The cholesteric liquid crystal, "ChLC", sample consists of a commercial, room-temperature nematic mixture whose dielectric anisotropy changes sign at a specific inversion frequency. The pitch of the cholesteric liquid crystal material is lower than the wavelength of the illuminating light, usually in the range 0.2-0.5 $\mu$m, and is temperature independent. The cholesteric liquid crystal material exhibits a pronounced flexoelectric response and it has a positive dielectric anisotropy in the range 0.1-10. The cholesteric liquid crystal is highly birefringent material, i.e. with large $\Delta n$ (in the range 0.1-0.5). The cholesteric liquid crystal may also exhibit a sign reversal of the dielectric anisotropy with the frequency of the applied electric field. The cholesteric liquid crystal may also exhibit a sign reversal of the dielectric anisotropy with the frequency of the applied electric field.

In general, the invention includes a composite which is a photoreactive polymer and a nematic liquid crystal where the polymer (or the monomers from which the polymer is made) is present at an amount of from about 0.5 to about 20% by weight, preferably from about 1.0 to about 10% by weight, and more preferably from about 1.0 to about 5% by weight of the composite. Further, in the composite, the nematic liquid crystal is present in about 50 to about 80%, one or more chiral dopants is present at from about 10 to about 40%, the reactive monomer is present at from about 0.99 to about 9.9% and a photoinitiator is present at about 0.01 to about 0.1%, all percentages being based on weight. Further, the liquid crystal has a positive dielectric anisotropy i.e., from about 0 to 10, preferably from about 0 to 5. Further, the composite resides in the gap between two substrates of a liquid crystal cell further each including an alignment layer and an electrode, and the polymer polymerized into a polymer network which is localized to at least one of the substrate surfaces.

A suitable example of such a cholesteric liquid crystal which can be used alone or in combination is MLC2048 which is available from Merck. In this material, the parallel ($\epsilon_\parallel$) and perpendicular ($\epsilon_\perp$) dielectric permittivities follow the following relationship: $\epsilon_\parallel(0) > \epsilon_\perp(0) > \epsilon_\parallel(\infty)$ where the crossover frequency f is $\sim 10^4$ Hz. A typical cholesteric material consists of 72.0% of a nematic or MLC2048, 25.0 wt % chiral compounds mixture (CE1', CB15, R-1011, Merck), 2.85% reactive mesogenic monomer (RM257, Merck) and 0.15% photoinitiator Irgacure 651, Ciba) to give a cholesteric material with the intrinsic pitch of 0.56 micron, measured by using a spectrometer, which reflects a yellow green color on a microscopic measured by using spectrometer, which reflects a yellow green color on a microscopic cover slide.

EXAMPLES

Example 1

Preparation and Characterization of a Liquid Crystal Cell

The mesogenic monomer RM257 was added to ChLC and the mixture was vortex-mixed in a vial, heated to around 50° C. and cooled to room temperature. Commercial electro-optical cells with ITO electrodes (i.e. having an electrode area $\sim 10$ mm$^2$) and alignment layers deposited on the inner surface of the confining substrates and with $\mu$m spacers are used for a planar alignment. The mixture is sandwiched between two substrates with patterned electrodes and alignment layers deposited on the electrodes and rubbed and assembled in a fashion to provide homogeneous alignment. Glass spacers were used in order to control the uniformity of cell gap. The cell was heated to a high temperature exceeding the isotropic temperature of the mixture and cooled to room temperature either with 2.7 V/$\mu$m @ 1 KHz or without an applied voltage. Once such a texture was obtained, the cell is exposed to UV light at 0.8 mW/cm$^2$ intensity for 5 min at room temperature to form the spatially-ordered polymer. The selected UV light ($\lambda = 322$ nm) provided formation of polymeric network localized at the both substrates' surfaces because the high absorption by the liquid crystal mixture prevents photopolymerization of the reactive monomer in the bulk, thus leaving a substantial part of the volume free of the polymeric network.

FIG. 1 shows the polarizing optical micrographs the textures of short-pitched cholesteric material at different stage of cell preparation. The cholesteric material is heated to the isotropic and then cooled slowly to the room temperature under an electric field to obtain UHL texture. A small bias field is kept to prevent the uniform lying cholesteric helix from being disturbed before fixing the polymer to the substrate surfaces. The uniform texture in FIG. 1b is exposed to an UV illumination at room temperature. FIG. 1c shows the optical texture of the sample after exposure to UV light. The optical axis of the sample is laid at 30 degree with respect to the crossed polarizers at room temperature and without electric field. The strips of the cholesteric helix are relatively uniform after a 5-minutes UV exposure time, whereas dome size distribution is observed because of the non-uniformity of cell gap of the commercial single pixel cell. From this, it can be inferred that once the film is polymerized, the alignment of the cholesteric helix is maintained. FIG. 1d, the SEM of polymer morphology shows a spatially ordered polymer structure on substrate surface with 0.3 $\mu$m periodicity corresponding to half of the cholesteric pitch. The direction of the arrow in FIG. 1(b) represents the rubbing direction of the surface alignment layer.

Figure 2:
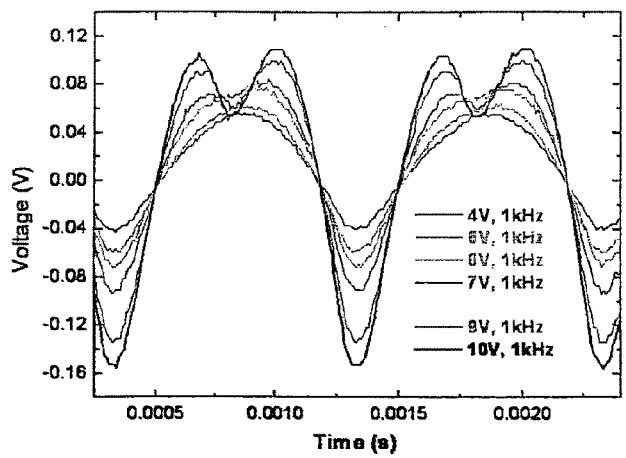
FIG. 2 is the electro-optical responses of a sample switched from linear to non-linear for various voltages on application of a triangle wave with frequency of 1 KHz.

FIG. 2 shows the electro-optical response of a cell driven in flexoelectric (in-plane-switching) mode by different voltages and frequencies with a triangle-wave form. At an applied field of 4.0 V for a 2-$\mu$m cell the ChLC exhibits a linear electro-optical response. The higher the applied voltage yields a larger angle deviation of optical axis in the plane parallel to the substrate which converts into the higher optical contrast between the field-ON and field OFF states. At 7V, the cell starts to show the non-linear response as a result of the dielectric coupling of liquid crystal molecules. The quadratic response becomes more intense with further increases to the field of 10V, which a sign of unwinding the helix. The complete unwinding of the cholesteric helix will take place when the field exceeds the critical field of a cholesteric material.

From the above-mentioned results, it follows that the in-plane switching of optical axis is limited by the dielectric coupling of the liquid crystal molecules that give a non-linear electro-optical response at high voltage. The combination of unique ChLC mixture and polymer configuration of this invention greatly enhanced the electro-optical performance and stability of in-plane switching of the ULH by:

1) Holding the ULH in the plane parallel to the substrates at zero voltage, and
2) Providing large switching angle for the IPS mode at high applied voltage.

Figure 3:
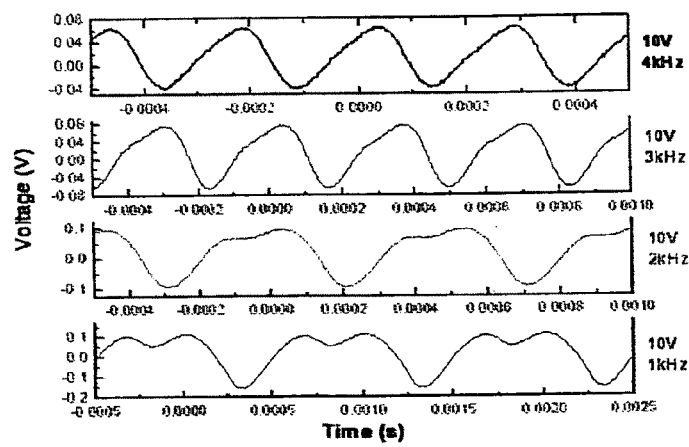
FIG. 3 is the electro-optical responses of a sample switched from non-linear to linear for various frequencies on application of a triangle wave with voltage of 10V.
Figure 4:
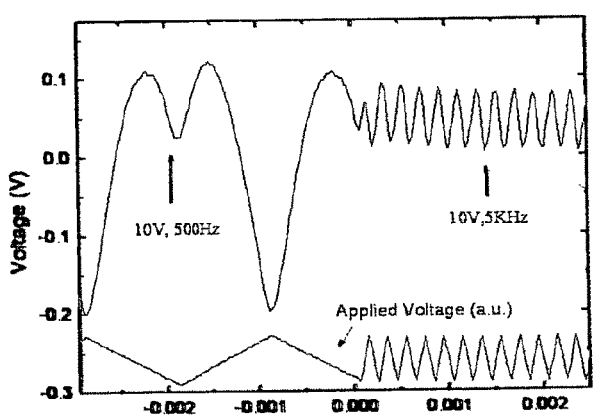
FIG. 4 is the electro-optical response switched from non-linear to linear by changing the frequencies from 500 Hz to 5 KHz on application of a triangle wave with voltage of 10V.

For example, by increasing the frequency of applied voltage from 1 KHz to 4 KHz the new ChLC material facilitates the IPS mode at the voltage of 10 V to enable the suppression of non-linear electro-optical response at high applied electric field (FIG. 3). Note the time scale of each oscilloscope trace was not matched thus, their pattern were not matched precisely. Yet the results demonstrated that it is possible to maintain the linear optical response by using a high frequency at a higher applied voltage. Further an example is shown in FIG. 4, in which the electro-optic response switched from non-linear to linear response by changing the frequency from 500 Hz to 5 KHz can clearly be seen. The cell is driven at the in-plane rotation of cholesteric helix at a voltage of 10V using a triangular wave. By applying a high frequency field the ULH is kept only to the in-plane rotation. The voltage parameter of the waveform also greatly influences the response time. The response time (turn-On plus turn-OFF) for the flexoelectro-optical switching is around 200 microseconds, which is similar to those reported in the prior arts.

FIG. 5 is a representation of the mixture of the monomer and the liquid crystal in a liquid crystal cell 10 where FIG. 5(a) is prior to polymerization and the liquid crystal 12 fills the gap 14 between two substrates 16 which each include an alignment layer and an electrode (not shown). FIG. 5(b) represents double surface stabilization by UV irradiation at a wavelength of 322 nm for 5 minutes of both sides of the liquid crystal cell 10'. In this instance the cell 10' includes the liquid crystal 12' and a surface stabilized polymer network 18, and the bulk of the liquid crystal in the gap is substantially free from the polymer network 18 which instead is generally localized to the inside surfaces (i.e., the opposing surfaces) of the substrates.

Figure 6:
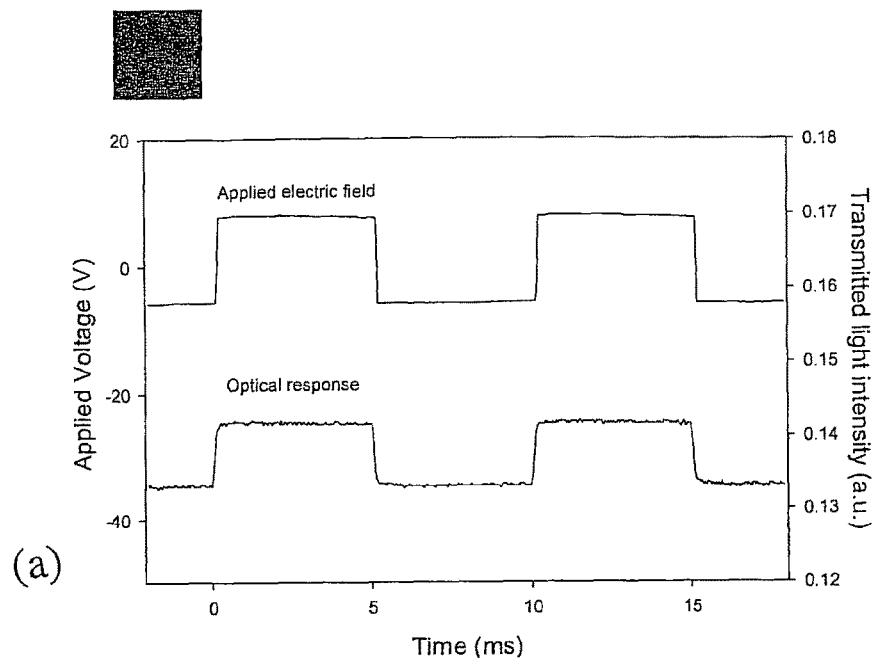
FIG. 6 shows graphs of the switching times for in-plane switching and out-of-plane switching where
Figure 6:
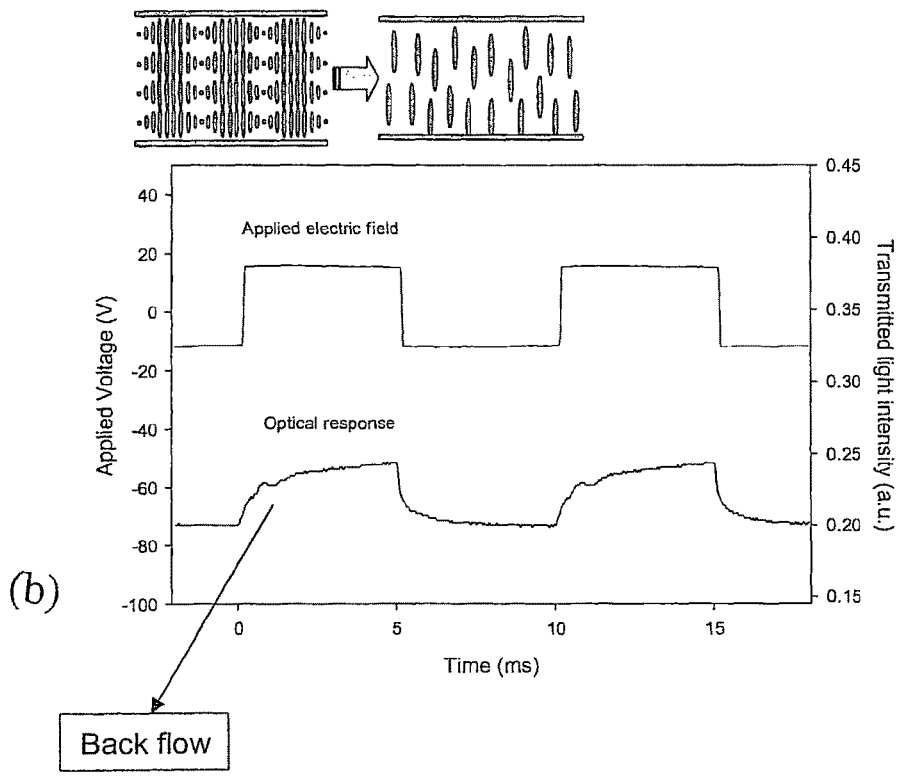

FIG. 6 shows graphs of the switching times for in-plane switching and out-of-plane switching. FIG. 6(a) is a plot of the applied voltage versus time for in-plane switching which results in a unipolar square wave with a $\tau_{on}$~$\tau_{off}$ of 100 μs at an applied electric field of 3.5V/μm and 1 Khz. FIG. 6(b) is a plot of the applied voltage versus time for out-of-plane switching with a $\tau_{on}$ of 1.9 ms and a $\tau_{off}$ of 1.5 ms at an applied field of 12.5V/μm and 1 KHz.

The invention relates to a LC device based on the flexoelectro-optical effect using a nematic with frequency modulation capability to form the UHL and a spatially-ordered polymer structure on surface. The LC device enables two switching modes (amplitude and phase modulation). The first switching mode, amplitude, demonstrates inversion at a lower frequency for higher but non-linear amplification and the second mode, phase modulation takes place at higher frequency with quicker and linear modulation. This renders the invention suitable for wide range applications including amplitude modulators, light switches, phase-only spatial light modulators, beam deflectors and flat panel displays.

The materials and devices have a wide range of commercial application possibilities in all the areas such as, phase-only spatial light modulators, beam deflectors, switchable retarders and flat panel displays. As the performance of the disclosed electro-optical devices is superior in several aspects (faster switching, two switching modes and large viewing angle) the application possibilities are broader.

Based upon the foregoing disclosure, it should now be apparent that the liquid crystal devices of the present invention will carry out the objects set forth hereinabove. It is, therefore, to be understood that any variations evident fall within the scope of the claimed invention and thus, the selection of specific component elements can be determined without departing from the spirit of the invention herein disclosed and described.

While in accordance with the patent statutes the best mode and preferred embodiment have been set forth, the scope of the invention is not limited thereto, but rather by the scope of the attached claims.

What is claimed is:

1. A method of making a liquid crystal device which provides high contrast in-plane switching by using the flexoelectro-optical effect of the liquid crystal, the method including the steps of
    forming a mixture of a dual frequency switchable sematic in a short-pitch cholesteric liquid crystal having a positive dielectric anisotropy from about 0 to 10, one or more photoisomerizable monomers, and a photoinitiator;
    introducing the mixture into a gap formed between two substrates;
    heating the mixture beyond the isotropic point of the liquid crystal to form a uniform laying helical texture of the mixture in the gap;
    allowing the mixture to cool to about room temperature;
    subjecting at least one side of the substrate to a ultraviolet light with a wavelength of from about 320 to about 380 nm and a having a sufficiently strong intensity to form an internal spatially ordered surface stabilized polymer network localized on a surface by in situ photopolymerization.

2. A method as set forth in claim 1 wherein the steps of heating and cooling are performed in the presence of an electric field.

3. A method as set forth in claim 2 wherein the step of subjecting the at least one side of the substrate to the ultra violet light is performed in the presence of an electric field.

4. A method as set forth in claim 1 wherein both substrate sides are subjected to an ultraviolet light.

5. A method as set forth in claim 1 wherein the light has a wavelength of about 320 to about 365 nm.

6. A method as set forth in claim 5 wherein a reflector is further used for the application of light.

7. A method as set forth in claim 1 wherein said mixture comprises a dual-frequency-switchable nematic liquid crystal, one or more chiral dopant, one or more reactive monomers, and a photoinitator.

8. A method as set forth in claim 7 wherein said nematic liquid crystal is present in about 50 to about 80%, one or more chiral dopant is present at from about 10 to about 40%, said reactive monomer is present at from about 0.99 to about 9.9% and said photoinitator is present at about 0.01 to about 0.1%, all percentages being based on weight.

* * * * *